United States Patent Office.

JAMES T. WILKINSON, OF LOCKPORT, NEW YORK.

Letters Patent No. 108,666, dated October 25, 1870; antedated October 8, 1870.

IMPROVEMENT IN ROOFING-CEMENTS.

The Schedule referred to in these Letters Patent and making part of the same.

*To all whom it may concern:*

Be it known that I, JAMES T. WILKINSON, of the city of Lockport, in the county of Niagara and State of New York, have invented a new and improved Water-proof Cement for roofing buildings, or for any other purposes where the same may be used to guard against water or weather; and I do hereby declare that the following is a full and exact description thereof; and To enable others skilled in the arts to make and use my cement and invention, I will proceed to describe its construction and operation.

In general, I compose my cement of ground anthracite coal, ground gypsum, and ground tan-bark, India rubber dissolved in prepared coal-tar, and commercial "pitch."

The coal-tar is melted and combined with the India rubber, so as to form a new composition of India rubber and coal-tar, in about the proportion of two gallons of coal-tar to twenty-five pounds of India rubber, or sufficient coal-tar to dissolve the India rubber.

Of this combination of coal-tar and India rubber, from twenty-five to fifty pounds, according to the position in which it is to be used, I add to one barrel of the pitch. I then heat this, and add the other ingredients in the proportion of about two parts each of coal and gypsum to one part of tan-bark, and mix all together to the consistency of thin mortar.

By mixing the rubber dissolved in coal-tar with pitch, I form a basis which is elastic, impervious to water, will not evaporate, and is not affected by the heat of the sun or frost.

I am aware that coal-tar, India rubber, gypsum, tan-bark, and anthracite coal have been used in combination to form a cement for roofing and other purposes, and a patent issued therefor; and I disclaim any intention to ask for a patent upon such a combination; but I claim that the addition of the article known in commerce as pitch to the above-mentioned composition, in the manner and in about the proportions above set out, improves the same, by preventing the evaporation of any of the constituents, increasing its permanency and elasticity, and rendering it more impervious to water.

It is found in practice that coal-tar and many of its compounds are to a considerable extent volatile, and that they evaporate, shrink, and crack with the heat and sunlight of summer. This difficulty is entirely overcome by the use of the pitch, and we thereby get a compound practically indestructible, unless by mechanical violence.

What I claim as my invention, and desire to secure by Letters Patent, is—

The use of the article known in commerce as "pitch," a product, in a modified form, of the pitch-pine of the southern States of the United States, in combination with anthracite coal, gypsum, tan-bark, coal-tar, and India rubber, or other substances substantially the same, and which will produce the same effect, combined in the manner and for the purposes as above set out, or in a manner the equivalent thereof, and producing like effects.

JAMES T. WILKINSON.

Witnesses:
   JNO. W. HAYES,
   M. SEAMAN.